United States Patent Office 2,874,164
Patented Feb. 17, 1959

2,874,164

PREVENTION OF COMBUSTION IN OXYGEN-OZONE MIXTURES

Victor A. Hann, St. Davids, Pa., assignor to The Welsbach Corporation, Philadelphia, Pa., a corporation of Delaware No Drawing. Application August 21, 1956
Serial No. 605,423

8 Claims. (Cl. 260—339)

This invention relates to processes for the prevention of combustion in oxygen-ozone mixtures and more particularly to the prevention of combustion in systems contaminated by ozonides or their decomposition products formed during the oxidation of unsaturated organic materials by oxygen-ozone mixtures and is a continuation-in-part of my co-pending application Serial No. 508,807, filed May 16, 1955, now abandoned, under the title "Prevention of Combustion in Oxygen-Ozone Mixtures."

It is well known in the art that the efficiency of an ozonator is increased almost a hundred percent when oxygen is used in the production of ozone as opposed to the production of ozone using air. This increased efficiency is obtained without increase of the electrical energy supplied to the ozonator. It is also well known that mixtures containing more than 20% oxygen plus certain inert diluents ($N_2$, $CO_2$) when fed to an ozonator will increase the efficiency of production. The use of oxygen to generate oxygen-ozone mixtures is unexpectedly potentially hazardous when the oxygen-ozone mixtures are subsequently used to oxidize unsaturated organic materials. In the oxidation of unsaturated organic materials which contain ethylenic carbon-carbon double bonds with oxygen-ozone mixture films containing ozonides of ozonide decomposition products which are products resulting from the reaction of ozone with said double bonds are formed in the system and I have found that these films and the oxygen-ozone atmosphere surrounding them act very much like a combustible mixture although there appears to be far too little organic vapor to form a combustible mixture. An extremely rapid combustion takes place when these ozonides or ozonide decomposition products in an oxygen-ozone atmosphere are triggered by a spark or other suitable means and in an enclosed system can easily produce a violent explosion. I do not know with certainty why these films in an oxygen-ozone atmosphere react in this way and so will not burden the description of the present invention with reasons for this observed phenomenon because of the possibility that such reasons may be erroneous.

I have found most unexpectedly that combustion of these films in an oxygen-ozone atmosphere can be inhibited by the presence in the oxygen-ozone atmosphere of certain gaseous diluents. The amount of diluent employed will vary with the diluent itself, with the ozonide or ozonide decomposition product in the film, and will depend upon the ignition temperature of the ozonide or ozonide decomposition product in the system and upon the geometry of the system. The amount and specific diluent may be selected in accordance with the ozonide or ozonide decomposition product present and examples of suitable diluents will be described below.

It is accordingly an object of the present invention to provide novel processes for the prevention of combustion in oxygen-ozone mixtures including films of ozonides or ozonide decomposition products in which the oxygen-ozone mixture is diluted with certain gaseous diluents.

Another object of the present invention is to provide such processes in which the amount of a specific diluent to efficiently suppress combustion can be readily determine for a given system containing films of known ozonides or ozonide decomposition products having ascertainable ignition temperatures.

Other and further objects of the present invention will appear from the following description of illustrative embodiments of the same.

The processes of the present invention are capable of various procedural embodiments without departing from the present inventive concept and reference should therefore be had to the appended claims to determine the scope of this invention.

As noted above, the films containing ozonides or ozonide decomposition products in the presence of an oxygen-ozone atmosphere act like a combustible mixture although there is apparently insufficient organic matter in the gas phase to constitute a combustible mixture. These films contain ascertainable proportions of ozonides or ozonide decomposition products. The ozonide portion of the film may be any ozonide produced by the action of ozone upon an unsaturated organic compound. I have found that the proportion of ozonide necessary to produce hazardous conditions is not fixed but varies with the specific ozonide and the percentage of oxygen in the gas phase over the film. These films develop in ozone reactions and recycling systems either by the films forming on surfaces in the reactor itself or from spray or carry-over in the gas stream.

The hazardous nature of these films was not known prior to my discovery thereof and the suppression of combustion in such films by limited dilution of the oxygen in the oxygen-ozone mixture by certain gaseous diluents is most unexpected.

The present invention does not propose such dilution as to bring the oxygen-ozone mixture below the point where there is no longer enough oxygen to support combustion but, depending upon the ozonide involved and the system in which it is found, the present invention proposes dilution of the oxygen to approximately air proportions, say approximately 20 to 50% oxygen, at least for certain ozonides, to eliminate combustion. In a dilution of this degree sufficient oxygen is present to support normal combustion but combustion is not supported in the ozonide films here under consideration.

The phenomenon with which the present invention is concerned acts as if a combustible mixture were present but there is too little organic material in the gas phase to constitute a combustible mixture. This is demonstrated by experimental observations in which a film of oleic acid on a cool surface in pure oxygen will not support combustion. No combustible mixture is here present since the gas phase is substantially pure oxygen. A film of oleic acid ozonide, on the other hand, on a cool surface in pure oxygen will readily support combustion. A combustible mixture is again not present since only substantially pure oxygen is present in the gas phase. It is further observed that a film of oleic acid ozonide on a cool surface in air will not support combustion. No combustible mixture is present.

It has been pointed out above that the amount of diluent required to suppress combustion will depend in part upon the geometry of the particular system involved. Factors such as temperature, ozone concentration, diluent involved, specific ozonide involved, type of ignition source, and geometry of the system affect the concentration of diluent required to prevent ignition of the oxygen-ozone film system. It is manifestly impractical to give examples of all ozonides under all possible conditions. However representative examples are given below to describe the present invention.

The temperatures which are given in the examples below are the "ignition temperatures" determined by the particular ozonide and system in which it occurs as well as by the other factors discussed above. This "ignition temperature" is not a characteristic property of the ozonide or ozonide decomposition product in the film and depends upon the properties of the particular environment in question.

In a characteristic example of the processes of the present invention, explosion was caused by triggering ignition with a spark of films of oleic acid ozonide in an atmosphere of approximately 3% ozone, 42% oxygen and 55% $CO_2$ when the temperature of the ozonide was raised to approximately 180° C. When the oxygen concentration was diluted to 37% and the $CO_2$ concentration was raised to 60% no explosion could be triggered by means of a spark under exactly the same conditions.

In another characteristic example of the processes of the present invention, explosion was caused by triggering ignition with a spark of films of oleic acid ozonide in an atmosphere of 100% oxygen when the ozonide was approximately at room temperature. When the oxygen was diluted with approximately 50% carbon dioxide, no explosion could be triggered by means of a spark under exactly the same conditions.

In another example of the processes of the present invention, explosion was caused by triggering ignition with a spark of films of oleic acid ozonide in an atmosphere of 2% ozone, and 98% oxygen. When the oxygen was diluted to approximately 42% with carbon dioxide, no explosion could be triggered by means of a spark under exactly the same conditions.

In the above example and others given here, the ozone concentration has been purposely held constant to about 1 to 3%. In employing known ozonators for use in the present invention, the ozone concentration is not expected to exceed the range of 0.5 to 5%.

In another representative situation in accordance with the present invention explosions were triggered by a spark in a system which included α-pinene ozonide in a 1% ozone-oxygen-carbon dioxide atmosphere. Less violent explosions occurred when the carbon dioxide component of the atmosphere was increased in the range of 50–65% and no explosions could be triggered when the concentration of carbon dioxide was 70% or more of the atmosphere.

Several methods may be employed for adding the inert diluent gas to the oxygen-ozone mixture in accordance with the present invention. In one procedure, substantially pure oxygen is passed through the ozone generator, forming a mixture of ozone and oxygen, which is then diluted by addition in proper amount of a gas selected from the group of carbon dioxide, argon, and helium. This gaseous mixture is then passed into a suitable reactor and the ozonization reaction occurs stripping the ozone from the gas mixture. If carbon dioxide is the diluent the oxygen-diluent mixture is then passed to a suitable scrubber or condenser where the diluent is separated from the oxygen and the oxygen is then compressed and purified as may be necessary and recycled to the ozonator.

In another procedure for supplying the diluent gas to the oxygen-ozone mixture a stream of substantially pure oxygen is diluted with enough carbon dioxide to suppress subsequent ignition and this gaseous mixture is then passed through the ozonators to form a small concentration of ozone therein. The gaseous mixture with ozone is then passed through a reaction system in which the ozone is stripped from the oxygen-carbon dioxide mixture and the stripped oxygen-carbon dioxide mixture is then purified, as may be required, and returned to the ozonator as a recycled gas, any loss of carbon dioxide being adjusted before recycling to the ozonators.

It is to be understood, of course, that in place of the carbon dioxide mentioned in the paragraph above argon and helium may be employed as the gaseous diluent. It is also to be understood that known types of ozonators, known types of oxygen purifying systems and apparatus, and known systems for cleaning up the spent oxygen-diluent gas mixtures may be employed all within the scope of the present concept.

As an example of the present invention using helium, an explosion was caused by triggering ignition with a spark of the films and vapors of the ozonide of tall oil fatty acids in an atmosphere of approximately 2% ozone and 98% oxygen. When the oxygen concentration was reduced to approximately 79% by diluting with helium, no explosion could be triggered by means of a spark under exactly the same conditions.

In another example of the processes of the present invention, explosion was caused by triggering ignition with a spark of the films and vapors oleic acid ozonide in an atmosphere of approximately 2% ozone and 98% oxygen. When the oxygen concentration was reduced to approximately 25% by diluting with argon, no explosion could be triggered by means of a spark under exactly the same conditions.

It should now be apparent to one skilled in the art that by the present invention I have provided novel processes for the prevention of combustion in oxygen-ozone mixtures which in every way satisfy the several objectives described above.

Changes in or modifications to the above described illustrative embodiments of the present invention may now be apparent without departing from the present inventive concept and reference should therefore be had to the appended claims to determine the scope of this invention.

What is claimed is:

1. In a process for inhibiting combustion in a system containing gaseous ozone and oxygen and films of products resulting from the reaction of ozone with an acid selected from the group consisting of oleic acid, linoleic acid, mixtures of oleic acid and linoleic acid and alpha-pinene, the steps of adding a diluent selected from the group consisting of carbon dioxide, argon and helium to the gaseous oxygen so that the oxygen comprises 20–80 weight percent of the gaseous mixture, then ozonizing said oxygen-containing gas to an ozone concentration of approximately 1–3 weight percent in a conventional ozonizer discharge, and then bringing the ozone-containing gaseous mixture in contact with said films.

2. In a process for inhibiting combustion in a system containing gaseous ozone and oxygen and films of organic compounds resulting from the reaction of ozone with an acid selected from the group consisting of oleic acid, linoleic acid, mixtures of oleic acid and linoleic acid and alpha-pinene, the steps of adding carbon dioxide to the gaseous oxygen so that the oxygen comprises 30–42 weight percent of the gaseous mixture, then ozonizing said oxygen-containing gas to an ozone concentration of approximately 1–3 weight percent in a conventional ozonizer discharge, and then bringing the ozone-containing gaseous mixture in contact with said films.

3. In a process for inhibiting combustion in a system containing gaseous ozone and oxygen and films resulting from the reaction of ozone with an acid selected from the group consisting of oleic acid, linoleic acid, mixtures of oleic acid and linoleic acid and alpha-pinene, the steps of adding helium to the gaseous oxygen so that the oxygen comprises approximately 79 weight percent of the gaseous mixture, then ozonizing said oxygen-containing gas to an ozone concentration of approximately 1–3 weight percent in a conventional ozonizer discharge, and then bringing the ozone-containing gaseous mixture in contact with said films.

4. In a process for inhibiting combustion in a system containing gaseous ozone and oxygen and films of organic compounds resulting from the reaction of ozone with an acid selected from the group consisting of oleic acid, linoleic acid, mixtures of oleic acid and linoleic acid and alpha-pinene, the steps of adding argon to the gaseous oxygen so that the oxygen comprises approximately 25 weight percent of the gaseous mixture, then ozonizing said oxygen-containing gas to an ozone concentration of approximately 1–3 weight percent in a conventional ozonizer discharge, and then bringing the ozone containing gaseous mixture in contact with said films.

5. In a process for inhibiting combustion in a system containing gaseous ozone and oxygen and films of organic compounds resulting from the reaction of ozone with an acid selected from the group consisting of oleic acid, linoleic acid, mixtures of oleic acid and linoleic acid and alpha-pinene, the steps of adding a diluent selected from the group consisting of carbon dioxide, argon and helium to gaseous ozonized oxygen so that oxygen comprises 20–80 weight percent of the mixture, and then bringing the ozone-containing gaseous mixture in contact with said films.

6. In a process for inhibiting combustion in a system containing gaseous ozone and oxygen and films of organic compounds resulting from the reaction of ozone with an acid selected from the group consisting of oleic acid, linoleic acid, mixtures of oleic acid and linoleic acid and alpha-pinene, the steps of adding carbon dioxide to gaseous ozonized oxygen so that oxygen comprises 30–42 weight percent of the mixture and then bringing the ozone-containing gaseous mixture in contact with said films.

7. In a process for inhibiting combustion in a system containing gaseous ozone and oxygen and films of organic compounds resulting from the reaction of ozone with an acid selected from the group consisting of oleic acid, linoleic acid, mixtures of oleic acid and linoleic acid and alpha-pinene, the steps of adding helium to gaseous ozonized oxygen so that oxygen comprises approximately 79 weight percent of the mixture, and then bringing the ozone-containing gaseous mixture in contact with said films.

8. In a process for inhibiting combustion in a system containing gaseous ozone and oxygen and films of organic compounds resulting from the reaction of ozone with an acid selected from the group consisting of oleic acid, linoleic acid, mixtures of oleic acid and linoleic acid and alpha-pinene, the steps of adding argon to gaseous ozonized oxygen so that oxygen comprises approximately 25 weight percent of the mixture, and then bringing the ozone-containing gaseous mixture in contact with said films.

References Cited in the file of this patent

UNITED STATES PATENTS

| | | |
|---|---|---|
| 2,083,572 | McKee | June 15, 1937 |

FOREIGN PATENTS

| | | |
|---|---|---|
| 234,163 | Great Britain | May 12, 1925 |

OTHER REFERENCES

Yeaw et al.: Chem. Abstract, vol. 33, page 5158 (1939).

Taylor: Inorganic and Theoretical Chem., page 615, W. Heinemann Ltd., London, 9th ed. (1952).

UNITED STATES PATENT OFFICE
CERTIFICATE OF CORRECTION

February 17, 1959

Patent No. 2,874,164

Victor A. Hann

It is hereby certified that error appears in the printed specification of the above numbered patent requiring correction and that the said Letters Patent should read as corrected below.

Column 1, line 39, for "of ozonide" read -- or ozonide --; column 2, lines 3 and 4, for "determine" read -- determined --.

Signed and sealed this 9th day of June 1959.

(SEAL)
Attest:

KARL H. AXLINE
Attesting Officer

ROBERT C. WATSON
Commissioner of Patent